(12) United States Patent
Lentine et al.

(10) Patent No.: US 10,341,096 B1
(45) Date of Patent: Jul. 2, 2019

(54) TRANSCEIVERS AND RECEIVERS FOR DISCRETE-VARIABLE QUANTUM KEY DISTRIBUTION

(71) Applicant: National Technology & Engineering Solutions of Sandia, LLC, Albuquerque, NM (US)

(72) Inventors: Anthony L. Lentine, Albuquerque, NM (US); Christopher DeRose, Albuquerque, NM (US); Paul Davids, Albuquerque, NM (US); Hong Cai, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 93 days.

(21) Appl. No.: 15/289,601

(22) Filed: Oct. 10, 2016

(51) Int. Cl.
H04L 9/08 (2006.01)
H04B 10/70 (2013.01)

(52) U.S. Cl.
CPC ................... H04L 9/0858 (2013.01)

(58) Field of Classification Search
CPC .................................................. H04L 9/0858
See application file for complete search history.

(56) References Cited

U.S. PATENT DOCUMENTS

| | | | |
|---|---|---|---|
| 5,768,378 A * | 6/1998 | Townsend | G02F 1/13471 380/256 |
| 5,850,441 A | 12/1998 | Townsend et al. | |
| 6,940,647 B2 * | 9/2005 | Islam | G02B 6/272 250/227.12 |
| 7,403,623 B2 | 7/2008 | Cerf et al. | |
| 7,627,126 B1 * | 12/2009 | Pikalo | H04L 9/0858 356/473 |
| 7,929,700 B2 | 4/2011 | Lodewyck et al. | |
| 7,936,883 B2 | 5/2011 | Imai et al. | |
| 8,165,298 B2 | 4/2012 | Kawamoto et al. | |
| 8,477,939 B2 * | 7/2013 | Youn | H04L 9/0858 380/256 |
| 8,654,980 B2 | 2/2014 | Harrison et al. | |
| 8,683,192 B2 | 3/2014 | Ayling et al. | |

(Continued)

OTHER PUBLICATIONS

Koch, Benjamin, et al. "First endless optical polarization and phase tracker." Optical Fiber Communication Conference. Optical Society of America, 2013. (Year: 2013).*

(Continued)

*Primary Examiner* — Robert B Leung
*Assistant Examiner* — Sameera Wickramasuriya
(74) *Attorney, Agent, or Firm* — Medley, Behrens & Lewis, LLC (57) ABSTRACT

Various technologies for performing discrete-variable (DV) quantum key distribution (QKD) with integrated electro-optical circuits are described herein. An integrated DV-QKD system uses Mach-Zehnder modulators (MZMs) to modulate a polarization of photons at a transmitter and select a photon polarization measurement basis at a receiver. A transmitter of a DV-QKD system further uses phase shifters to correct for non-idealities of the MZM in output provided to a polarization beam splitter. A receiver of a DV-QKD system can use phase shifters between a polarization beam splitter and an MZM to correct for non-idealities of the polarization beam splitter and the MZM on the receiver side.

19 Claims, 6 Drawing Sheets

(56) References Cited

U.S. PATENT DOCUMENTS

| | | |
|---|---|---|
| 9,148,225 B2 | 9/2015 | Lowans et al. |
| 2005/0088738 A1* | 4/2005 | Islam ............... G02B 6/272 359/484.04 |
| 2006/0222180 A1* | 10/2006 | Elliott ............. H04L 9/0852 380/263 |
| 2007/0182968 A1* | 8/2007 | Nishioka ........... H04B 10/70 356/491 |
| 2008/0037998 A1* | 2/2008 | Zhengfu ........... H04L 9/0858 398/184 |
| 2009/0196419 A1* | 8/2009 | Tapster ............ H04L 9/0858 380/256 |
| 2010/0245837 A1* | 9/2010 | Yamamoto ........ H04B 10/677 356/491 |
| 2010/0290626 A1* | 11/2010 | Jenkins ............. H04B 10/30 380/278 |
| 2011/0051215 A1* | 3/2011 | Zhou ................ H04B 10/505 359/238 |
| 2011/0150226 A1* | 6/2011 | Cho ................. H04B 10/70 380/278 |
| 2013/0077980 A1* | 3/2013 | Guo ................. H04B 10/61 398/214 |

OTHER PUBLICATIONS

C. Silberhorn, N. Korolkova and G. Leuchs, "Quantum cryptography with bright entangled beams," Conference Digest. 2000 International Quantum Electronics Conference (Cat. No. 00TH8504), Nice, France, 2000, pp. 1 pp.-. (Year: 2000).*

C. Silberhorn, N. Korolkova and G. Leuchs, "Quantum cryptography with bright entangled beams," Conference Digest. 2000 International Quantum Electronics Conference (Cat. No. 00TH8504), Nice, France, 2000, pp. 1 (Year: 2000).*

* cited by examiner

TRANSCEIVERS AND RECEIVERS FOR DISCRETE-VARIABLE QUANTUM KEY DISTRIBUTION

STATEMENT OF GOVERNMENTAL INTEREST

This invention was developed under Contract DE-AC04-94AL85000 between Sandia Corporation and the U.S. Department of Energy. The U.S. Government has certain rights in this invention.

BACKGROUND

Quantum key distribution (QKD) refers to communication methods that use quantum mechanical principles to guarantee secure communication between two parties. In QKD, a (random) secret key is shared between the two parties, where the key is known only by the two parties to the communication. The key is used to encrypt and decrypt messages. Security of communication between the two parties is assured as a result of the quantum uncertainty principle. If an eavesdropper on a communications channel measures data being transmitted, anomalies are introduced in the data that are then passed down the communications channel and received by a receiver that is party to the secure communication. The receiver can detect the eavesdropper by observing the presence of these anomalies, and can either cease the communication or discard compromised bit values of the shared key.

Discrete variable QKD (DV-QKD) systems modulate and analyze properties of single photons in optical signals to encode and decode data for QKD. DV-QKD systems can encode data on polarization states of single photons, where a polarization state of a photon can represent a logic "1" or a logic "0". A DV-QKD protocol, BB84, defines a method for performing DV-QKD in which two measurement basis sets are used by a transmitter to transmit information, wherein each basis set defines two different photon polarization states corresponding to the two logic states, for a total of four possible polarization values. A receiver, not knowing which basis set a photon was transmitted in, measures the polarization state of the photon in a randomly-chosen basis. The transmitter and the receiver then compare chosen bases for each measurement to securely determine which of a plurality of communicated bits will make up a shared encryption key.

SUMMARY

The following is a brief summary of subject matter that is described in greater detail herein. This summary is not intended to be limiting as to the scope of the claims.

Various technologies to facilitate performing QKD are disclosed herein. In an example, a DV-QKD system is implemented with a first integrated electro-optical circuit functioning as a transmitter and a second integrated electro-optical circuit functioning as a receiver. In the example, the transmitter transmits data on an optical signal by modulating a polarization of photons of the signal using a Mach-Zehnder modulator (MZM). The MZM of the transmitter modulates the polarization by controlling amplitudes and a relative phase of its two optical outputs. The outputs of the MZM are received at a phase shifter that modifies a relative phase of two optical signals to correct for non-idealities in the MZM and increase a polarization extinction ratio of photons output by a polarizing beam splitter responsive to receiving the two optical signals. The receiver receives photons output by the transmitter at a second polarizing beam splitter and uses another MZM to choose a measurement basis on which a photodetector measures the polarization. Additional phase shifters can adjust a relative phase of outputs of the receiver's polarizing beam splitter in order to correct for non-idealities in the second polarizing beam splitter and the other MZM that can impair accuracy and speed of DV quantum communication.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Various technologies pertaining to transmitters and receivers for DV-QKD are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, the terms "component" and "system" are intended to encompass optical elements and electrical circuits. Additionally, as used herein, the term "exemplary" is intended to mean serving as an illustration or example of something, and is not intended to indicate a preference.

Figure 1:
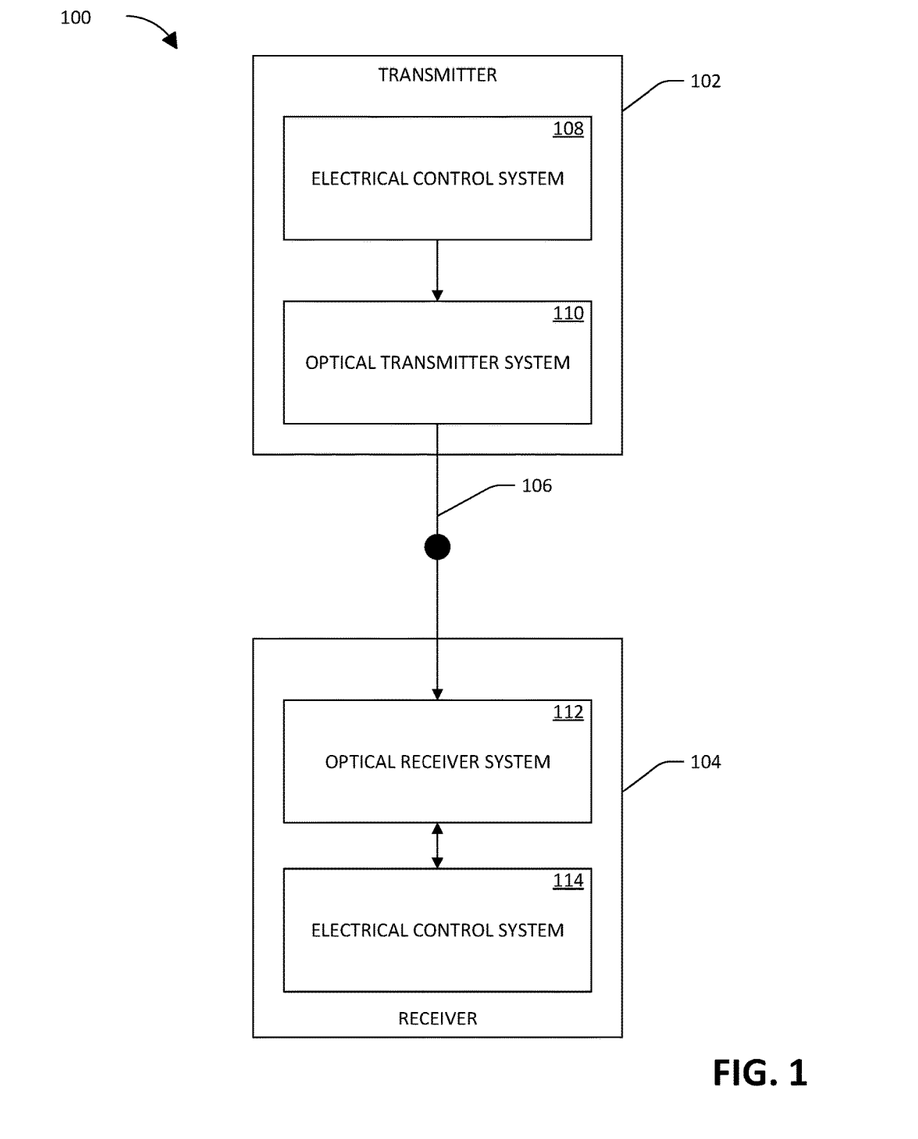
FIG. 1 is a functional block diagram of an exemplary system that facilitates QKD.

With reference to FIG. 1, an exemplary system 100 that facilitates QKD with integrated electro-optical circuits is illustrated, wherein an integrated electro-optical circuit is a device comprising electrical components and optical components implemented on a same semiconductor substrate. The system 100 includes a transmitter 102, a receiver 104, and an optical communications path 106 by which the transmitter 102 and the receiver 104 engage in optical communication. The transmitter 102 and the receiver 104 are each integrated electro-optical circuits with electrical and optical components on a same substrate. In an example, the transmitter 102 is a single integrated electro-optical circuit comprising an electrical control system 108 and an optical transmitter system 110, wherein the electrical control system controls a transmission output of the optical transmitter system 110. For instance, the electrical control system 108 is an FPGA, an ASIC, a real time processor, etc. that is configured to control optical signal sources, phase shifters, MZMs, etc. In another example, the receiver 104 is an integrated electro-optical circuit comprising an optical receiver system 112 that receives optical signals from the optical communications path 106. The receiver 104 also comprises an electrical control system 114 that configures and controls the operation of the optical receiver system 112 and receives data from the optical receiver system 112. The exemplary system 100 may be configured to perform DV-QKD protocols or other quantum communication protocols, depending on the configuration of the optical transmitter system 110 and the optical receiver system 112. A DV-QKD configuration of these systems 110 and 112 is described in greater detail below with respect to FIGS. 2-3.

Figure 2:
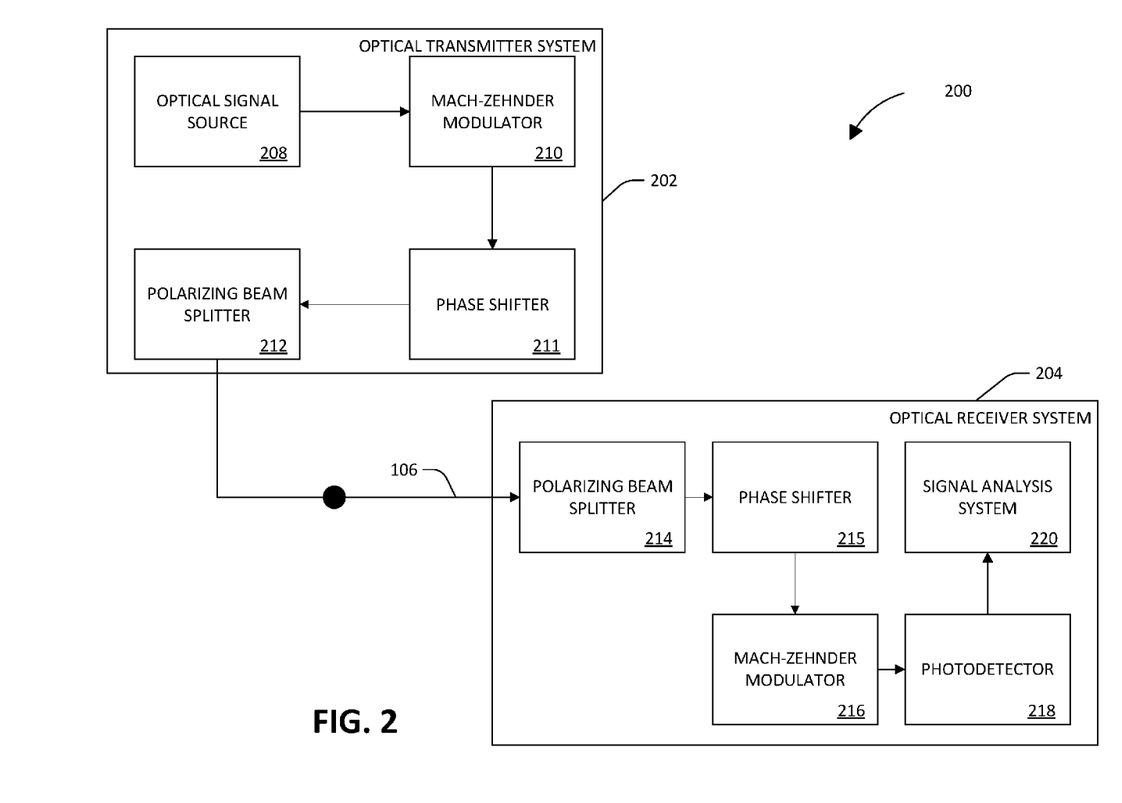
FIG. 2 is a functional block diagram of an exemplary system that facilitates DV-QKD.

Referring now to FIG. 2, an exemplary system 200 that facilitates polarization-modulation DV-QKD is illustrated. The system 200 includes an optical transmitter system 202, an optical receiver system 204, and the optical communications path 106 connecting the optical transmitter system 202 and the optical receiver system 204. The optical transmitter system 202 and the optical receiver system 204 are respective integrated electro-optical circuits, wherein the components of each circuit are on respective same semiconductor chips.

The optical transmitter system 202 comprises an optical signal source 208 that generates an optical signal. For instance, the optical signal source 208 can be or include a laser or other suitable narrowband light source. The optical transmitter system 110 further comprises an MZM 210, a phase shifter 211 and a polarizing beam splitter 212. The MZM 210 receives the optical signal, creates two optical output signals, and modulates an amplitude of each of the two output signals and a relative phase between the signals. The phase shifter 211 can further modify the relative phase between the signals in order to correct for non-idealities in the output of the MZM 210. The polarizing beam splitter 212 receives the two output signals from the phase shifter 211 and combines them in orthogonal polarizations to create a single optical output signal. The single optical output signal of the polarizing beam splitter 212 has an output polarization that is dependent on the respective amplitudes and relative phase of the two output signals of the MZM 210 after being phase-shifted by the phase shifter 211. The polarizing beam splitter 212 outputs the single optical output signal to the communications path 106 whereupon the optical transmitter system 202 transmits the single optical signal to the optical receiver system 204.

The optical receiver system 204 comprises a polarizing beam splitter 214 that receives the optical signal from the communications path 106 and splits the signal into two separate signals. The two separate signals are then received at a phase shifter 215. The phase shifter 215 shifts a relative phase of the two signals (e.g., by shifting a phase of a first signal in the two signals, shifting a phase of a second signal in the two signals, or shifting a respective phase of each of the first and second signals in the two signals). The optical receiver system 204 also includes a two-input MZM 216 that is in optical communication with the phase shifter 215. The MZM 216 receives the two phase-shifted signals and introduces an additional phase shift between them in order to select a measurement basis, wherein the measurement basis is selected based upon an electrical control input from the electrical control system 114. Accordingly, the MZM 216 outputs two optical signals, where the MZM 216 has shifted the phase of at least one of the two optical signals.

The optical receiver system 204 further includes a photodetector 218 that is in optical communication with the MZM 216. The photodetector 218 receives the two signals output by the MZM 216, and is configured to generate electrical signals that are indicative of amplitudes of the optical signals output by the MZM 216. The optical receiver system 204 further comprises a signal analysis system 220 that is in communication with the photodetector 218. The signal analysis system 220 receives the measurements generated by the photodetector 218 and determines whether the optical signal received by the polarizing beam splitter 214 corresponds to a logic "1" or logic "0" in the measurement basis chosen by the MZM 216.

The inclusion of phase shifters 211 and 215 in the transmitter system 110 and the receiver system 204, respectively, to correct non-idealities in performance of the beam splitters and MZMs improves polarization extinction so that logic states transmitted by the transmitter 102 and received by the receiver 104 are more easily distinguished. For example, the electrical control system 108 can cause the phase shifter 211 to impart a relative phase between the two output signals of the MZM 210 that increases a polarization extinction ratio of the single optical output signal of the polarizing beam splitter 212 from a value of the polarization extinction ratio of the single output signal when the phase shifter does not shift the phase of the output of the MZM 210. This results in fewer errors in communication between the transmitter 102 and the receiver 104, thereby increasing a reliability and speed of communication.

The phase shifters 211 and 215 can also compensate for polarization rotation of signals arising from transmission over the communications channel 106. In an example wherein the communications channel 106 comprises a fiber-optic cable, the fiber-optic cable may rotate the polarization of a transmitted signal by some value, which polarization rotation can be corrected for by modifying the phase shift imparted by the phase shifters 211 and 215. For example, when the communications channel 106 comprises the fiber-optic cable, the cable may impart a polarization rotation of 15 degrees, and a transmitted polarization states of 0°/90° is received as a state of 15°/105°. The phase shifters 211 and 215 can be configured to compensate for this rotation in the channel 106 such that a transmission intended to be in the 0°/90° basis is received as 0°/90° rather than 15°/105°.

Details of the operation of the system 200 are now set forth. At the optical transmitter system 202, the optical signal source 208 generates a low-intensity optical signal. In an example, the optical signal source 208 is an attenuated laser capable of emitting single photons. The MZM 210 receives the low-intensity signal from the optical signal source 208 and generates two optical output signals. The MZM 210 modulates the two output signals on phase and amplitude, whereupon the output signals are received by the phase shifter 211 before passing to the polarizing beam splitter 212. The polarization of the single optical signal output by the polarizing beam splitter 212 depends on the amplitude and the phase of the output signals from the MZM 210 and the phase shifter 211. Thus, the MZM 210 and the phase shifter 211 can encode data on a polarization of the output of the polarizing beam splitter 212 by controlling the two output signals that are received by the polarizing beam splitter 212. The phase shifter 211 can be used to correct non-idealities in the output of the MZM 210.

In an example, the polarity state of an optical signal can be described by a polarization angle that refers to an angle between a horizontal reference and a polarization vector of the electric field of the photon. In an example in which the system 200 is used to implement the BB84 DV-QKD protocol, the polarization angle can be 0° or 90° corresponding to logic "1" and logic "0", respectively, in a first measurement basis, and can be 45° or 135° corresponding to the two logic states in a second measurement basis. In the exemplary implementation, the MZM 210, responsive to receiving an electrical control input from the electrical control system 108 controls the polarization of a photon in the low-intensity optical signal by modulating amplitude and phase of the optical signals received by the polarizing beam splitter 212 in order to encode a logic value in one of the two measurement bases. The polarizing beam splitter 212 transmits the single optical output signal on the optical communications path, the signal polarization being controlled by the modulation of the two output signals of the MZM 210 and the relative phase between the two output signals introduced by the phase shifter 211. In an example, the optical communications path 106 is a fiber-optic communications line.

The optical receiver system 204 receives the combined signal from the communications path 106 at the polarizing beam splitter 214. The polarizing beam splitter 214 splits the combined signal into two resulting signal components. In one example, the two resulting signal components have a same transverse electric polarization. In another example, the two resulting signal components can have a same transverse magnetic polarization. In still another example, one of the two resulting signal components can have a transverse electric polarization and the other of the two resulting signal components can have a transverse magnetic polarization. In these examples, polarization splitter-rotators can be used to modify polarizations of the two resulting signal components to a transverse electric polarization. The phase shifter 215 receives the two resulting signal components and modifies a relative phase between them by phase shifting one or both of the signal components. The MZM 216 then receives the phase-shifted signal components from the phase shifter 215.

As described below in greater detail with respect to FIG. 4, the MZM 216 selects a measurement basis in which the optical receiver system 204 measures the signal components by imparting a relative phase between the two signal components. In an example, the MZM 216 can be controlled by the electrical control system 114 of the receiver 104 to select the relative phase. By imposing a relative phase difference of 0° between the signal components, the MZM 216 selects the first measurement basis, in which logic 0 is represented by a photon polarization of 0° and a logic 1 is represented by a photon polarization of 90°. By imposing a relative phase difference of 90° between the signal components, the MZM 216 selects the second measurement basis, in which logic 0 is represented by a photon polarization of 45° and a logic 1 is represented by a photon polarization of 135°. As in the optical transmitter system 202, the phase shifter 215 is used to correct for non-idealities in the MZM 216. As a result of cross-talk and other imperfections in the MZM 216, phase shifters of the MZM 216 that are used to provide a relative phase between the signal components received from the beam splitter 214 may be insufficient to impart the phase required to select a desired measurement basis. The phase shifter 215 provides additional degrees of freedom that allow the relative phase of the two signal components to be more finely controlled. Thus, in order to select a measurement basis for the receiver 104, the electrical control system 114 can control the phase shifter 215 to select a first phase value for one of the two signal components and a second phase value for the other of the two signal components, and can control the MZM 216 to select a third phase value to impart to the signal component having the first phase value and a fourth phase value to impart to the signal component having the second phase value. For a desired measurement basis, therefore, the electrical control system 114 can control four different phase values, two each for the phase shifter 215 and the MZM 216, corresponding to the desired measurement basis. Similarly, the electrical control system 108 of the transmitter 102 can control four different phase values, two each for the phase shifter 211 and the MZM 210, in order to select a measurement basis and data for transmission.

The MZM 216 has two optical signal outputs, each of the optical signal outputs corresponding to a polarization of the chosen measurement basis. The photodetector 218 receives the two optical outputs of the MZM 216 and outputs an electrical signal comprising a measurement of an amplitude of at least one of the optical outputs. In an example, the photodetector comprises two photodiode circuits, each photodiode receiving one of the optical outputs of the MZM 216. The MZM 216 is configured such that one of the optical outputs to the photodetector 218 is at a maximum value at a logic state of the chosen measurement basis. In an example, in the first measurement basis one of the modulator outputs is at a maximum when the polarizing beam splitter 214 receives an optical signal with a polarization angle of 0° and the other modulator output is at a maximum when the polarizing beam splitter 214 receives an optical signal with a polarization angle of 90°. In another example, in the second measurement basis one of the modulator outputs is at its maximum at a polarization angle of 45° and the other modulator output is at its maximum at a polarization angle of 135°. The signal analysis system 220 receives the electrical signal comprising the measurement of the at least one optical output and determines a polarization value of the optical signal received by the optical receiver system 204 based upon the amplitude of the electrical signal and the measurement basis selected by the electrical control system 114. In an example, the signal analysis system 220 can comprise an FPGA, an ASIC, a real-time processor, etc., configured to perform the acts described. In another example, the signal analysis system 220 can be a component of the electrical control system 114. In the example, the electrical control system 114 can further comprise a data storage component that can store measurement basis data and polarization values, and the signal analysis system 220 can be configured to match polarization values with a measurement basis with which the MZM 216 received the optical signal.

Figure 3:
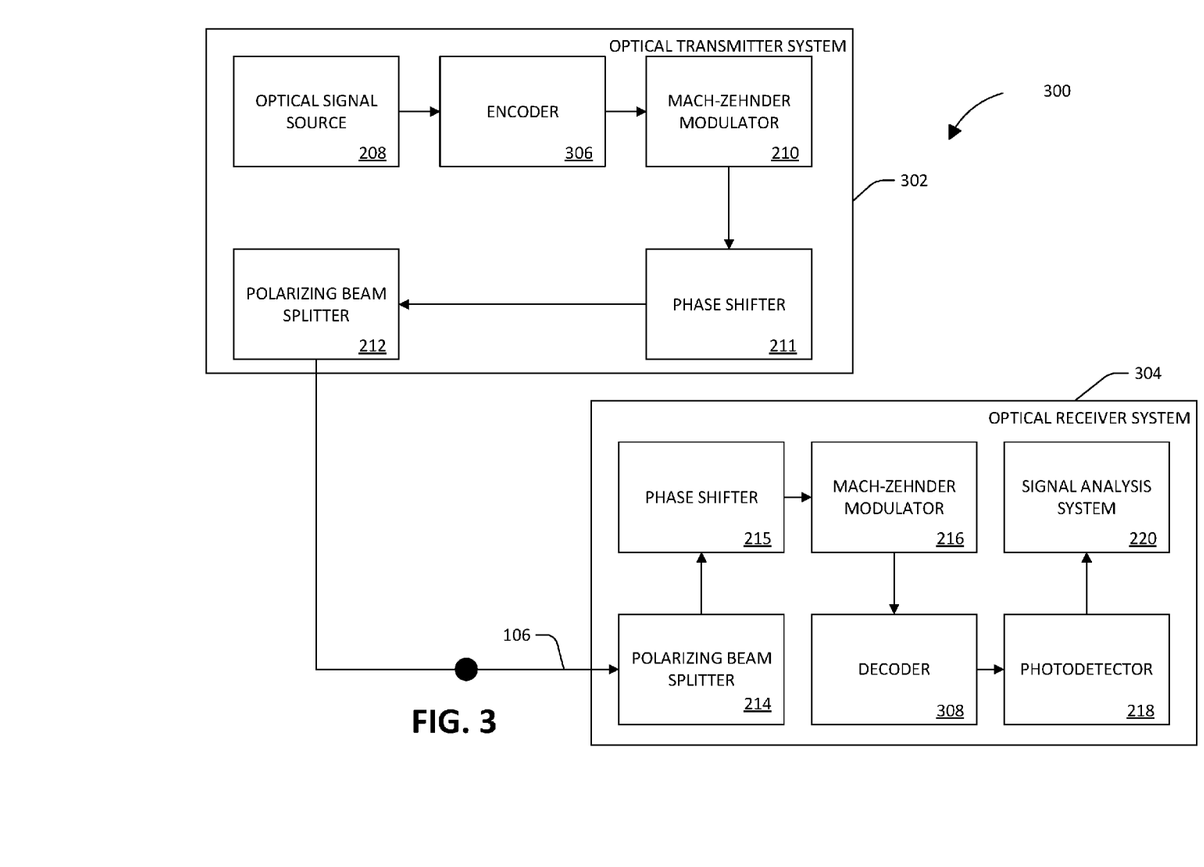
FIG. 3 is a functional block diagram of an exemplary system that facilitates DV-QKD in conjunction with optical modulation techniques.

Referring now to FIG. 3, a communication system 300 is illustrated that includes additional embodiments of an optical transmitter system 302 and an optical receiver system 304 configured to communicate via signals modulated on a polarization state and a quadrature characteristic. The transmitter system 302, in addition to the elements described above with respect to the optical transmitter 202, comprises an encoder 306 that modulates signals received from the optical signal source 208 prior to providing the signals to the MZM 210. The encoder 306 can modulate signals according to quadrature modulation techniques such as quadrature phase shift keying (QPSK), quadrature amplitude modulation (QAM), etc. After being modulated by the encoder 306, the signals are received at the MZM 210, whereupon they are encoded with data on a polarization according to the description accompanying FIG. 2 above. The optical receiver 304 further comprises a decoder 308 that receives the two optical output signals from the MZM 216 and demodulates the signals according to the modulation imposed by the encoder 306 (e.g., QPSK, QAM, etc.). The demodulated signals are then provided to the photodetector 218 whereupon the signal analysis system 220 determines a received data value.

Figure 4:
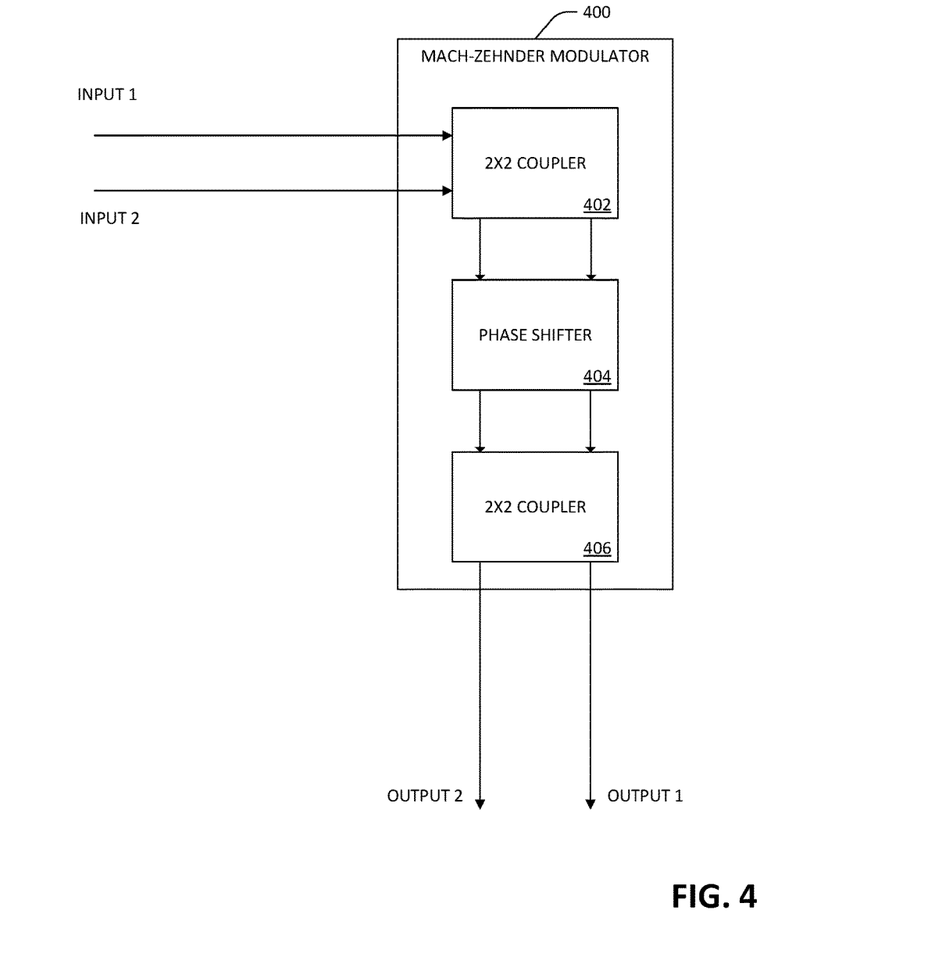
FIG. 4 is a functional block diagram of an exemplary MZM that facilitates DV-QKD.

Referring now to FIG. 4, an exemplary MZM 400 is illustrated. The exemplary MZM 400 comprises a two-input two-output (2×2) optical coupler 402 configured to receive two optical signals, input 1 and input 2. The modulator 400 further comprises a phase shifter 404 that receives optical signals output from the 2×2 optical coupler 402 and phase shifts one or both of the optical signals to result in a relative phase difference between two outputs of the phase shifter 404. As described above, the relative phase difference of the MZM 210 of the optical transmitter system 110 can be used to control a polarization of photons transmitted over an optical transmission medium. The MZM 216 of the optical receiver system 112 can select the relative phase difference (e.g., responsive to receiving a control signal from the electrical control system 114) to select a measurement basis in which the photodetector 218 measures the polarization of photons received. The MZM 400 also comprises a 2×2 coupler 406 configured to receive the two outputs of the phase shifter 404 and to output two optical signals, output 1 and output 2. In an example, the 2×2 couplers 402 and 406 are 90° couplers.

Figure 5:
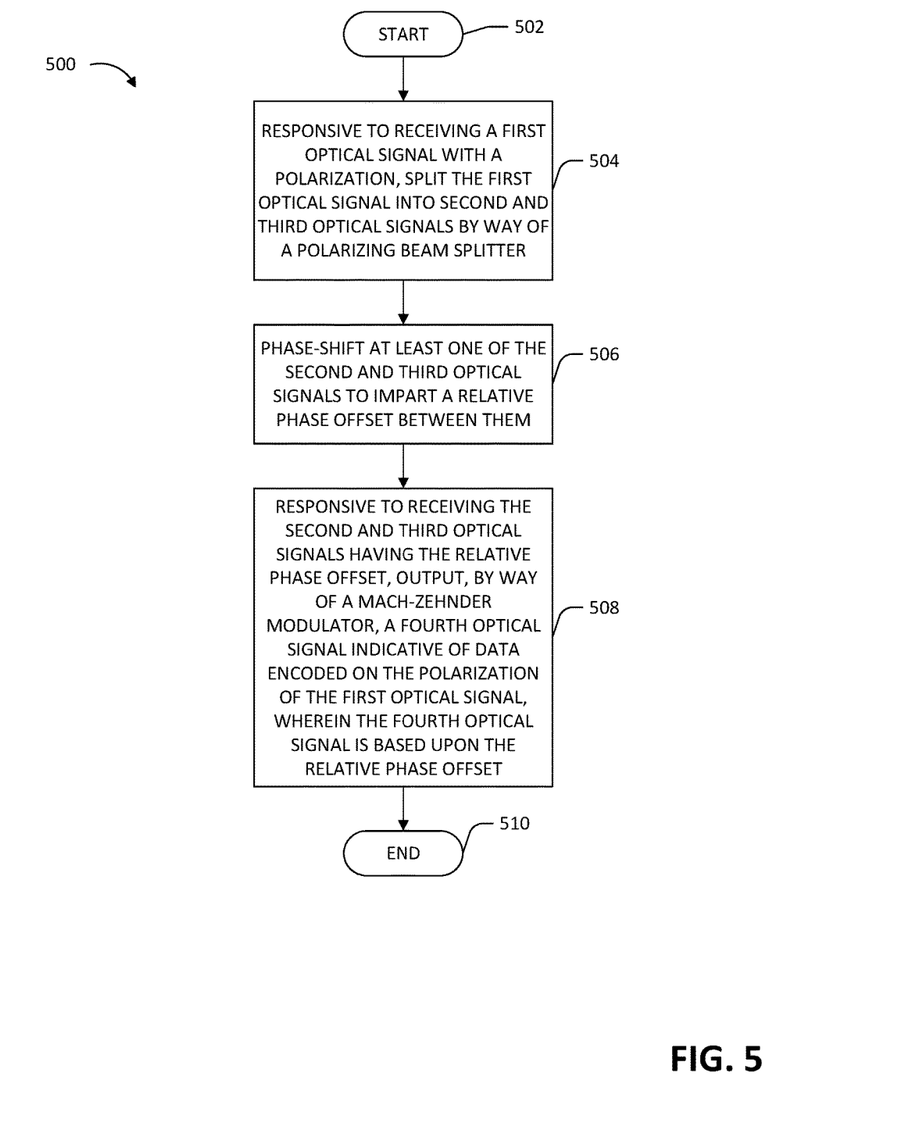
FIG. 5 is a flow diagram that illustrates an exemplary methodology for facilitating DV-QKD in an integrated optics implementation.

FIG. 5 illustrates an exemplary methodology relating to performing QKD with integrated optics components. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 5, a methodology 500 that facilitates DV-QKD is illustrated. The methodology 500 begins at 502, and at 504 an optical signal having a polarization is split into second and third optical signals by way of a polarizing beam splitter. In an example, the optical signal is received over a fiber transmission line from an integrated electro-optical circuit functioning as a transmitter. At 506, the second and third optical signals are phase-shifted to impart a relative phase offset between the second optical signal and the third optical signal. At 508, responsive to receiving the second and the third optical signals that have been phase-shifted to have the relative phase offset, an MZM outputs a fourth optical signal indicative of data encoded on the polarization of the first optical signal. The fourth optical signal is based upon the relative phase offset between the second optical signal and the third optical signal. In an example, an electrical control system can provide control signals to a phase shifter to select the relative phase offset and can provide other control signals to the MZM to control parameters of the MZM used to select a measurement basis. At 510, the methodology 500 ends.

Figure 6:
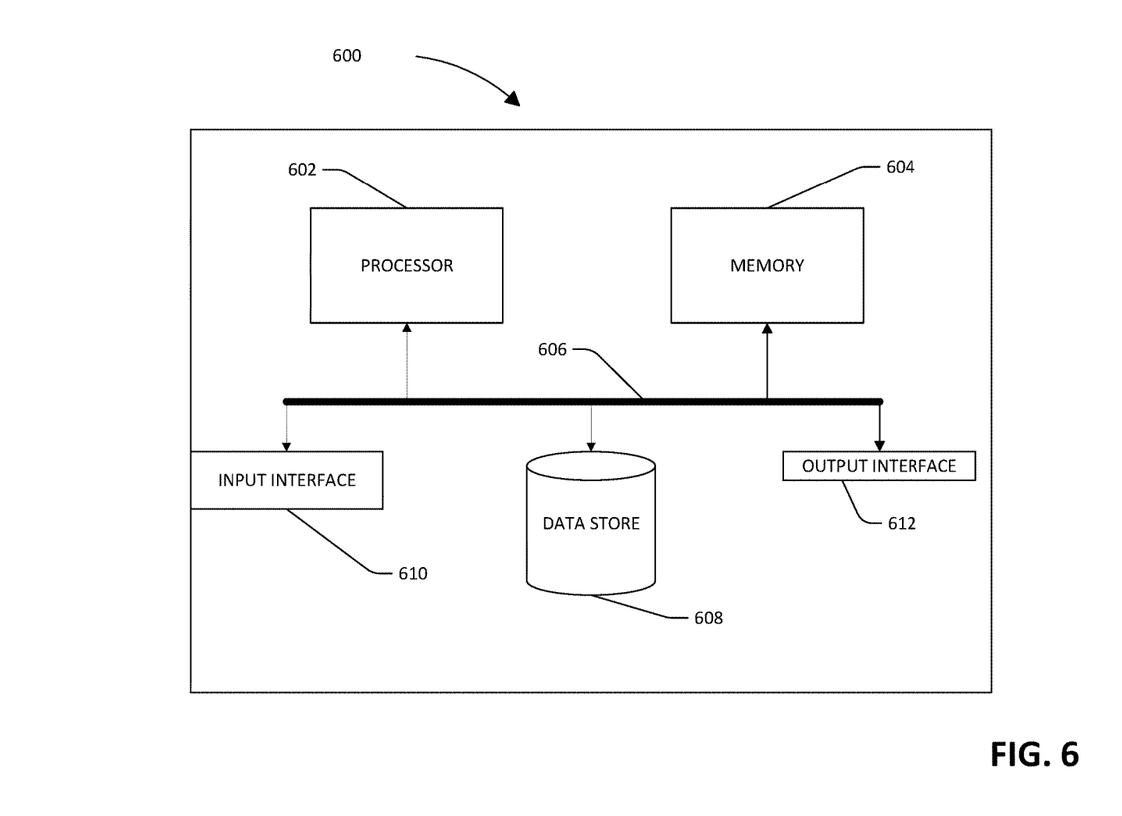
FIG. 6 is an exemplary computing system.

Referring now to FIG. 6, a high-level illustration of an exemplary computing device 600 that can be used in accordance with the systems and methodologies disclosed herein is illustrated. For instance, the computing device 600 may be used in a system that prepares or stores data for reception or transmission via the QKD systems and methods described herein. By way of another example, the computing device 600 can be used in a system that allows a user to prepare and select data to be transmitted via a QKD communications system. In still another example, the computing device 600 can be used to implement functionality described with respect to the electrical controls system 108 and 114 described herein. The computing device 600 includes at least one processor 602 that executes instructions that are stored in a memory 604. The instructions may be, for instance, instructions for implementing functionality described as being carried out by one or more components discussed above or instructions for implementing one or more of the methods described above. The processor 602 may access the memory 604 by way of a system bus 606. In addition to storing executable instructions, the memory 604 may also store data received from a QKD system.

The computing device 600 additionally includes a data store 608 that is accessible by the processor 602 by way of the system bus 606. The data store 608 may include executable instructions, received QKD data, etc. The computing device 600 also includes an input interface 610 that allows external devices to communicate with the computing device 600. For instance, the input interface 610 may be used to receive instructions from an external computer device, from a user, etc. The computing device 600 also includes an output interface 612 that interfaces the computing device 600 with one or more external devices. For example, the computing device 600 may display text, images, etc. by way of the output interface 612.

It is contemplated that the external devices that communicate with the computing device 600 via the input interface 610 and the output interface 612 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 600 in a manner free from constraints imposed by input devices such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 600 may be a distributed system. Thus, for instance, several devices may be in communication by way of a network connection and may collectively perform tasks described as being performed by the computing device 600.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A discrete-variable quantum (DVQ) optical receiver in communication with a DVQ optical transmitter, the DVQ optical receiver comprising:
    a polarizing beam splitter that receives a first optical signal transmitted by the DVQ optical transmitter, the first optical signal having a polarization, the polarization indicative of data encoded on the first optical signal by the DVQ optical transmitter, the polarizing beam splitter configured to output a second optical signal and a third optical signal responsive to receiving the first optical signal, wherein an amplitude of the second optical signal, an amplitude of the third optical signal, and a relative phase between the second and third optical signals is based upon the polarization of the first optical signal;
    a first phase shifter that receives the second optical signal and imparts a first phase shift to the second optical signal;
    a second phase shifter that receives the third optical signal and imparts a second phase shift to the third optical signal; and
    a Mach-Zehnder modulator (MZM) comprising:
        a first optical coupler that receives the phase-shifted second optical signal and the phase-shifted third optical signal;
        a phase shifting component that shifts a relative phase between signals output by the first optical coupler; and
        a second optical coupler that receives the phase-shifted output signals from the phase shifting component and outputs the fourth optical signal,
    wherein the fourth optical signal is indicative of the data encoded on the polarization of the first optical signal by the DVQ optical transmitter.

2. The DVQ receiver of claim 1, wherein the receiver is configured to perform a discrete-variable quantum key distribution protocol.

3. The DVQ optical receiver of claim 1, wherein the polarizing beam splitter, the first and second phase shifters, and the MZM are implemented on a same chip substrate.

4. The DVQ receiver of claim 1, wherein the phase shifting component comprises:
    a third phase shifter that imparts a third phase to a first output signal of the first optical coupler; and
    a fourth phase shifter that imparts a fourth phase to a second output signal of the first optical coupler.

5. The DVQ receiver of claim 4, wherein the third phase and the fourth phase are based upon the selected measurement basis.

6. The DVQ receiver of claim 1, the first phase shift and the second phase shift being based upon the selected measurement basis.

7. The DVQ receiver of claim 1, wherein the MZM has first and second output ports, wherein the MZM outputs the fourth signal to the first output port when the data encoded on the first optical signal is a logic "0" and the MZM outputs the fourth signal to the second output port when the data encoded on the first optical signal is a logic "1".

8. The DVQ receiver of claim 1, further comprising:
a photodetector that receives the fourth optical signal and outputs an electrical signal indicative of the data encoded on the fourth optical signal.

9. A discrete-variable quantum (DVQ) optical transmitter, comprising:
an optical signal source that outputs a first optical signal;
a Mach-Zehnder modulator (MZM) configured to receive the first optical signal and to output a second optical signal and a third optical signal;
a phase shifter configured to shift a relative phase of the second optical signal and the third optical signal; and
a polarizing beam splitter, wherein the polarizing beam splitter receives the second and third optical signals and outputs a fourth optical signal based at least in part upon the relative phase between the second and third optical signals, wherein further data is encoded on a polarization of the fourth optical signal.

10. The DVQ transmitter of claim 9, wherein the transmitter is configured to perform a discrete-variable quantum key distribution protocol.

11. The DVQ transmitter of claim 9, wherein the MZM, the phase shifter, and the polarizing beam splitter are implemented on a same chip substrate.

12. The DVQ transmitter of claim 9, wherein the optical signal source is an attenuated laser.

13. The DVQ transmitter of claim 9, wherein the MZM outputs the second optical signal and the third optical signal based upon a control signal from an electrical control system, the control signal indicative of a measurement basis for the data encoded on the polarization of the fourth optical signal.

14. The DVQ transmitter of claim 9, the data being encoded on the polarization of the fourth optical signal as one of:
0° corresponding to logic "0" in a first measurement basis;
90° corresponding to logic "1" in the first measurement basis;
45° corresponding to logic "0" in a second measurement basis; or
135° corresponding to logic "1" in the second measurement basis.

15. The DVQ transmitter of claim 9, wherein the MZM comprises:
a first optical coupler configured to receive the first optical signal and to output first and second signal components;
a phase shifter configured to modify a relative phase of the first and second signal components; and
a second optical coupler that receives the first and second signal components, the second optical coupler configured to output the second optical signal and the third optical signal based upon the relative phase of the first and second signal components.

16. The DVQ transmitter of claim 15, wherein the first and second optical couplers are 90° couplers.

17. The DVQ transmitter of claim 9, wherein the phase shifter shifting the relative phase of the second optical signal and the third optical signal increases a polarization extinction ratio of the fourth optical signal relative to a value of the polarization extinction ratio absent the phase shifter shifting the relative phase of the second optical signal and the third optical signal.

18. A method to facilitate discrete-variable quantum (DVQ) optical communication, the method comprising:
responsive to receiving a first optical signal with a polarization, wherein data is encoded on the polarization of the first optical signal by a transmitter, splitting the first optical signal into a second optical signal and a third optical signal by way of a polarizing beam splitter;
phase-shifting at least one of the second optical signal and the third optical signal to impart a relative phase offset between the second optical signal and the third optical signal; and
responsive to receiving the second and third optical signals having the relative phase offset, outputting, by way of a Mach-Zehnder modulator, a fourth optical signal indicative of the data encoded on the polarization of the first optical signal, the fourth optical signal based upon the relative phase offset.

19. The method of claim 18, wherein the method is performed by an integrated electro-optical circuit.

* * * * *